US008092561B2

(12) United States Patent
Park et al.

(10) Patent No.: US 8,092,561 B2
(45) Date of Patent: Jan. 10, 2012

(54) CUTTING TOOL

(75) Inventors: Kwon Hee Park, Daegu (KR); Sung Su Chun, Daegu (KR); Sang Woong Na, Daegu (KR)

(73) Assignee: TaeguTec, Ltd., Daegu (KR)

( * ) Notice: Subject to any disclaimer, the term of this patent is extended or adjusted under 35 U.S.C. 154(b) by 294 days.

(21) Appl. No.: 12/521,282

(22) PCT Filed: Dec. 26, 2006

(86) PCT No.: PCT/KR2006/005707
§ 371 (c)(1),
(2), (4) Date: Jun. 25, 2009

(87) PCT Pub. No.: WO2008/078845
PCT Pub. Date: Jul. 3, 2008

(65) Prior Publication Data
US 2010/0037532 A1 Feb. 18, 2010

(51) Int. Cl.
*B24B 1/00* (2006.01)
*B24D 11/00* (2006.01)
*B32B 9/00* (2006.01)
*B32B 19/00* (2006.01)
*B23P 15/28* (2006.01)
*B26D 1/00* (2006.01)
*B26D 3/00* (2006.01)

(52) U.S. Cl. ............. 51/295; 51/309; 428/698; 407/119

(58) Field of Classification Search ............ 51/295, 51/309; 428/325, 697–699; 407/119
See application file for complete search history.

(56) References Cited

U.S. PATENT DOCUMENTS

| 5,076,815 A | 12/1991 | Kunz et al. |
| 6,811,580 B1 | 11/2004 | Littecke |
| 2004/0219395 A1 | 11/2004 | Imamura et al. |
| 2004/0228694 A1 | 11/2004 | Webb et al. |
| 2005/0260454 A1* | 11/2005 | Fang et al. ............ 428/698 |

FOREIGN PATENT DOCUMENTS

| JP | 10-094905 | 4/1998 |
| RU | 2 122 533 | 11/1998 |
| SU | 1379285 | 9/1983 |
| SU | 1733426 | 2/1989 |
| SU | 1659380 | 3/1989 |

OTHER PUBLICATIONS

Office Action in counterpart application No. 2009128655, filed Jul. 24, 2009.
Decision of Grant in counterpart application No. 2009128655/2.
International Search Report in PCT/KR2006/005707, dated Sep. 18, 2007.
Written Opinion in PCT/KR2006/005707, dated Sep. 18, 2007.

* cited by examiner

*Primary Examiner* — Anthony Green
*Assistant Examiner* — Pegah Parvini
(74) *Attorney, Agent, or Firm* — Womble Carlyle

(57) ABSTRACT

A cutting tool including a fine and uniform alumina-based substrate is disclosed herein. In an exemplary embodiment, the alumina-based substrate includes 0.1 to 25% by volume of one or more metal oxides, or 5 to 80% by volume of metal carbonitride and 0.01 to 10% by volume of one or more metal oxides. Metal constituting the metal oxide and the metal carbonitride is selected from the group consisting of elements from Groups III to VI (including La group and Ac group) of the periodic table, Mg and Co. The metal oxides added to alumina reside at the boundaries of alumina grains, thereby prohibiting the alumina grains from growing excessively during a sintering process.

6 Claims, 10 Drawing Sheets

Cutting Insert A

Cutting Insert B

Cutting Insert C

Cutting Insert D

Cutting Insert E

Cutting Insert F

Cutting Insert G

Cutting Insert H

CUTTING TOOL

TECHNICAL FIELD

The present invention generally relates to an alumina-based ceramic cutting tool, and more particularly to an alumina-based ceramic cutting tool with coating layers formed on its surface.

BACKGROUND ART

Alumina is widely used as a material for substrates of cutting tools due to its excellent mechanical properties and thermal resistance. A TiN coating layer is formed on the surface of an alumina cutting tool to improve surface roughness, reduce cutting resistance and prevent adhesion of workpiece on the cutting tool. However, the TiN coating layer has a low hardness and thus may be easily worn out due to the friction occurring during a cutting operation. When cutting hard materials such as a cast iron, the TiN coating layer tends to wear out more easily. Further, the TiN coating layer is easily oxidized at above 1000° C. under an atmospheric exposure. Thus, when the cutting tool performs a high-speed cutting, the TiN coating layer, which is subjected to a high temperature, tends to be easily oxidized and peeled off from the substrate.

The removal of the TiN coating layer causes the cutting edges to wear out rapidly. Further, it causes an increase in cutting resistance, thereby accelerating the abrasion of the cutting tool. This shortens the service life of the cutting tool.

DISCLOSURE

Technical Problem

It is an object of the present invention to provide a coated alumina-based ceramic cutting tool having an improved wear resistance.

It is another object of the present invention to provide a coated alumina-based ceramic cutting tool having an improved mechanical performance under high-speed cutting.

It is yet another object of the present invention to provide a coated alumina-based ceramic cutting tool having an enhanced tool life.

Technical Solution

In order to achieve the above objects and other objects, the cutting tool according to the present invention comprises an alumina-based substrate. Preferably, the substrate includes 0.1 to 25% by volume of one or more metal oxides, or 5 to 80% by volume of metal carbonitride and 0.01 to 10% by volume of one or more metal oxides. Metal comprising said metal oxide and said metal carbonitride is selected from a group consisting of elements of Groups III to VI (including La group and Ac group) in the periodic table of elements, Mg and Co. Said metal oxides added to alumina reside at the boundaries of alumina grains, thereby prohibiting the alumina grains from growing excessively during a sintering process. As a result, a fine and uniform alumina-based substrate may be obtained.

Further, when 5 to 80% by volume of metal carbonitride is added to alumina, fine alumina grains and uniform microstructure may be obtained with the same principle. Moreover, metal carbonitride provides a much increased toughness than metal oxides, thereby expanding the applications of the alumina-based ceramic cutting tool including the high-speed cutting of high-hardness steels.

Also, one or more Al—Ti—Cr based nitride coating layers are formed on the substrate of the cutting tool. The one or more Al—Ti—Cr based nitride coating layers are formed on the substrate of the cutting tool with a thickness of 0.3 to 5.0 μm, preferably 0.5 to 2.0 μm. The composition of said Al—Ti—Cr based nitride coating layer may be $Al_WTi_XCr_YSi_XC_VN_{1-V}$ (W+X+Y+Z=1, V=0~1).

Moreover, the coating layer may be formed by a physical vapor deposition (PVD) method.

BEST MODE FOR CARRYING OUT THE INVENTION

According to a first embodiment of the present invention, an alumina-based ceramic cutting insert comprises alumina and 0.1 to 25% by volume of one or more metal oxides. Metal composing said metal oxide is selected from a group consisting of elements of Groups III to VI (including La group and Ac group) in the periodic table of elements, Mg and Co. The cutting insert has one or more Al—Ti—Cr based nitride coating layers formed on the surface. Preferably, the one or more Al—Ti—Cr based nitride coating layer have a thickness of 0.3 to 5.0 μm, preferably 0.5 to 2.0 μm. When the thickness of the coating layer is less than 0.3 μm, the coating layer is easily worn out and peeled off during a cutting process. Thus, the effect of the coating layer of enhancing tool life is not provided. Further, when the coating layer is thicker than 0.5 μm, the adhesion strength between the substrate and the coating material becomes weak, and the coating layer is easily peeled off or damaged. This shortens the tool life.

Figure 1:
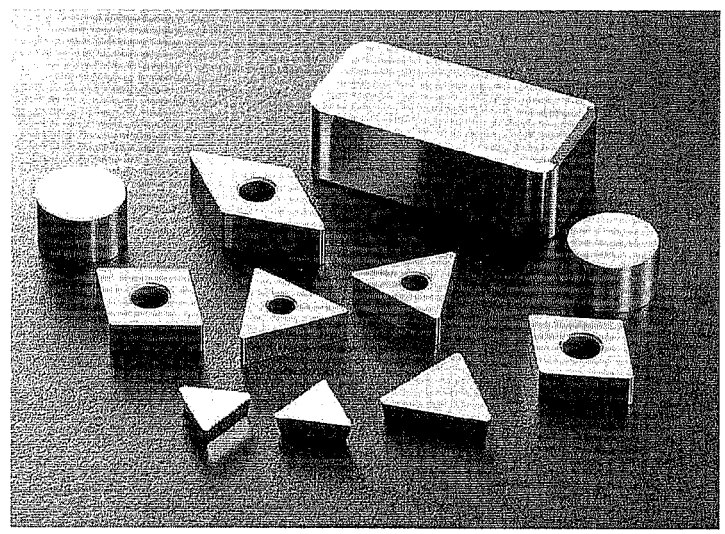
FIG. 1 is a photograph showing various types of cutting inserts where the present invention may be applied.

FIG. 1 is a photograph showing various types of cutting inserts, to which the present invention may be applied. While the present invention is described with reference to embodiments of cutting tools, it is appreciated that the present invention may also be applied to various mechanical structures or functional parts which are made from ceramic.

Figure 2:
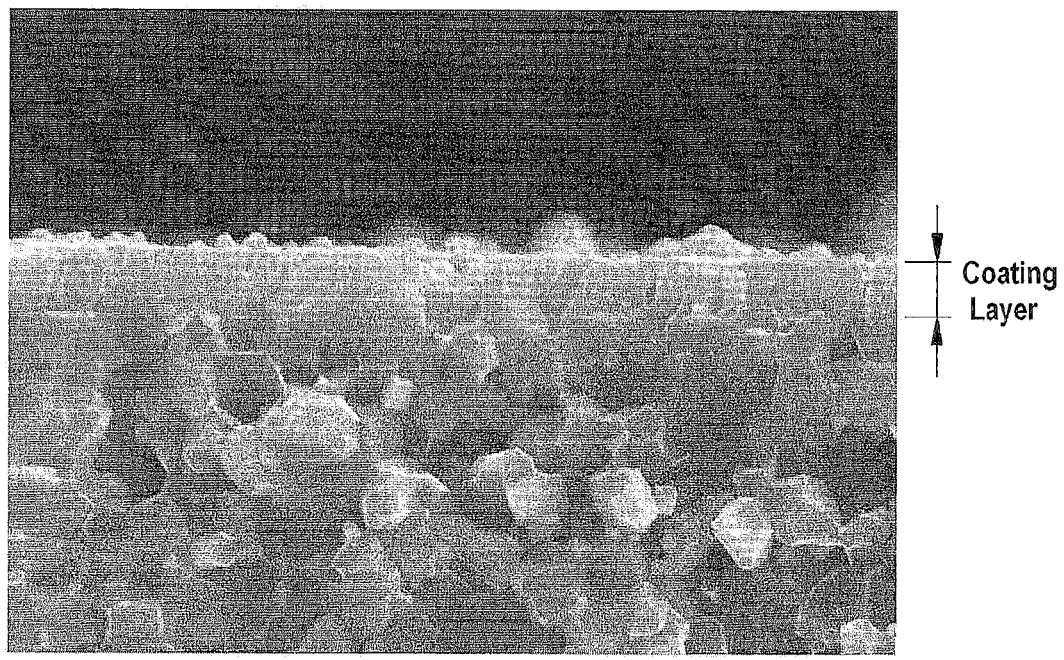
FIG. 2 is an electron microscopic photograph showing a cross-section of a cutting tool in accordance with a first embodiment of the present invention.
Figure 3:
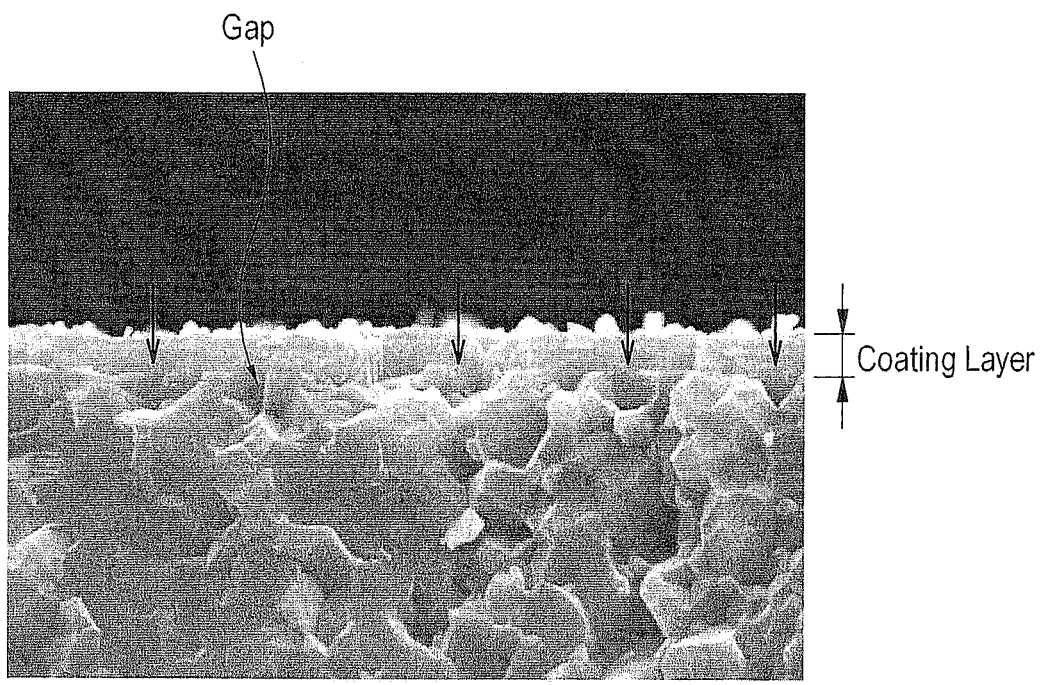
FIG. 3 is an electron microscopic photograph showing a cross-section of a conventional cutting tool.

FIGS. 2 and 3 are photographs of cross-sections of said cutting insert and a conventional cutting insert, respectively, taken by an electron microscope at a magnification of 7000 to compare the adhesion strengths of coating layers to substrates. FIG. 2 shows a cross-section of a cutting insert in accordance with the present invention, wherein a coating layer having a composition of (TiAlCrN+TiN) is PVD coated with a thickness of about 1.2 μm on an alumina-based substrate having a composition of ($Al_2O_3$+8.0% $ZrO_2$+0.3% MgO). FIG. 3 shows a cross-section of a conventional cutting insert, wherein a coating layer having a composition of TiN is PVD coated with a thickness of about 1.0 μm on an alumina-based substrate having a composition of ($Al_2O_3$+3.0% $ZrO_2$+ 0.3% MgO).

As can be seen through comparing FIGS. 2 and 3, the cutting insert of FIG. 2 has the coating layer closely adhered to the substrate without any gap, whereas the cutting insert of FIG. 3 shows a number of irregular gaps existing between the coating layer and the substrate (as indicated by arrows).

Figure 4:
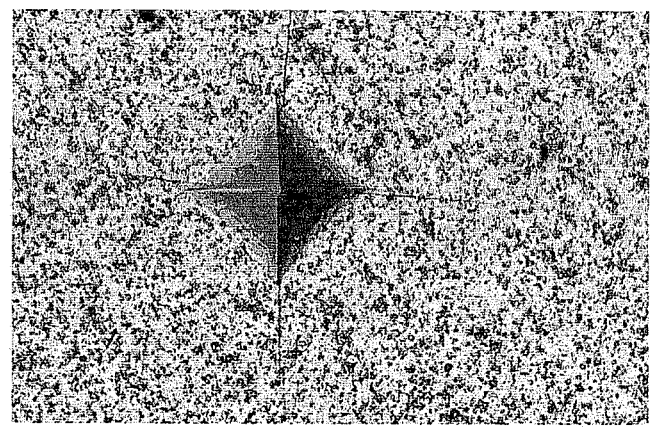
FIG. 4 is an optical microscopic photograph of the cutting tool of FIG. 2 after a Vickers hardness test is conducted to compare adhesion strength of the coating layer to the substrate.
Figure 5:
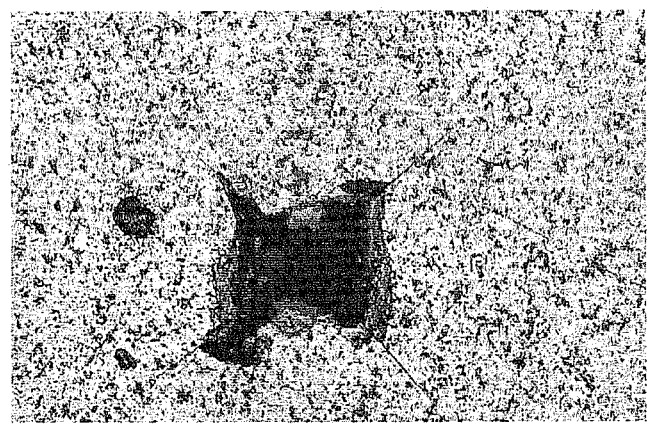
FIG. 5 is an optical microscopic photograph of the cutting tool of FIG. 3 after a Vickers hardness test is conducted to compare adhesion strength of the coating layer to the substrate.

FIG. 4 is a photograph for comparing the adhesion strength of the coating layer to the substrate, taken by an optical microscope at a magnification of 200. FIG. 4 shows a surface of the cutting insert according to the first embodiment of the present invention after it is subjected to a Vickers hardness test. FIG. 5 is a photograph taken by an optical microscope at a magnification of 200 and shows a surface of a conventional cutting insert after it is subjected to the same Vickers hardness test. A diamond pyramid (indenter) having an angle of 136° between the two faces was used in the Vickers hardness test.

By comparing FIGS. 4 and 5, it is confirmed that the coating layer of the cutting tool of FIG. 4 is not peeled off from the substrate and a pyramid-shaped indentation similar to the shape of the indenter is formed on its surface. The coating layer of the cutting tool of FIG. 5 is heavily peeled off from the substrate due to the pressure of the indenter. Such removal of the coating layer occurs due to the weak adhesion strength between the coating layer and the substrate.

According to a second embodiment of the present invention, an alumina-based ceramic cutting insert comprises alumina, 5 to 80% by volume of metal carbonitride, and 0.1 to 10% by volume of one or more metal oxides. Metal composing said metal carbonitride and said metal oxide is selected from a group consisting of elements of Groups III to VI (including La group and Ac group) in the periodic table of elements, Mg and Co. The cutting insert has one or more Al—Ti—Cr based nitride coating layers formed on the surface. Preferably, the one or more Al—Ti—Cr based nitride coating layer have a thickness of 0.3 to 5.0 μm, preferably 0.5 to 2.0 μm.

Figure 6:
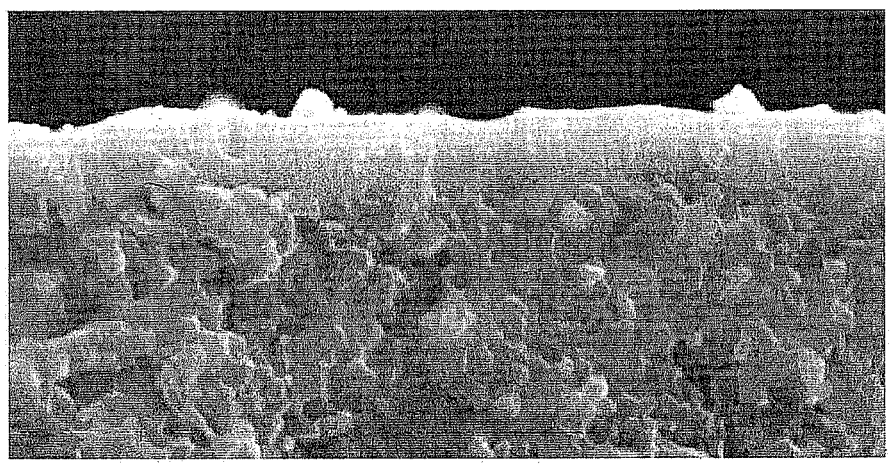
FIG. 6 is an electron microscopic photograph showing a cross-section of a cutting tool in accordance with a second embodiment of the present invention.
Figure 6:
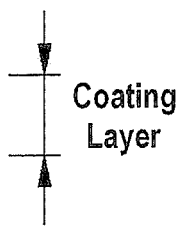
Figure 7:
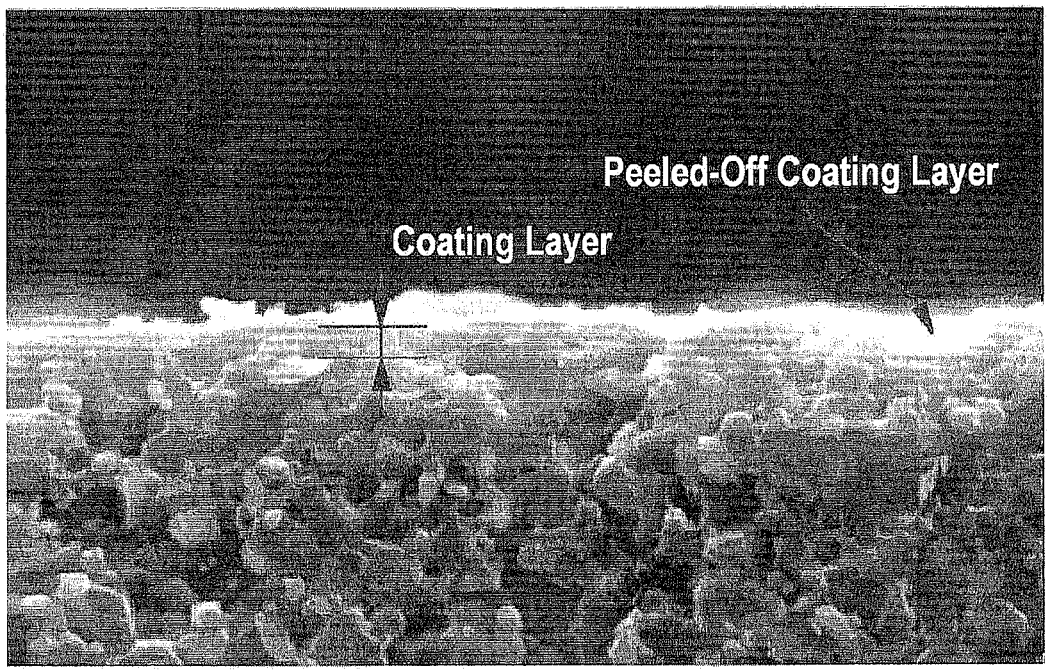
FIGS. 7 and 8 are electron microscopic photographs showing cross-sections of conventional cutting tools.
Figure 8:
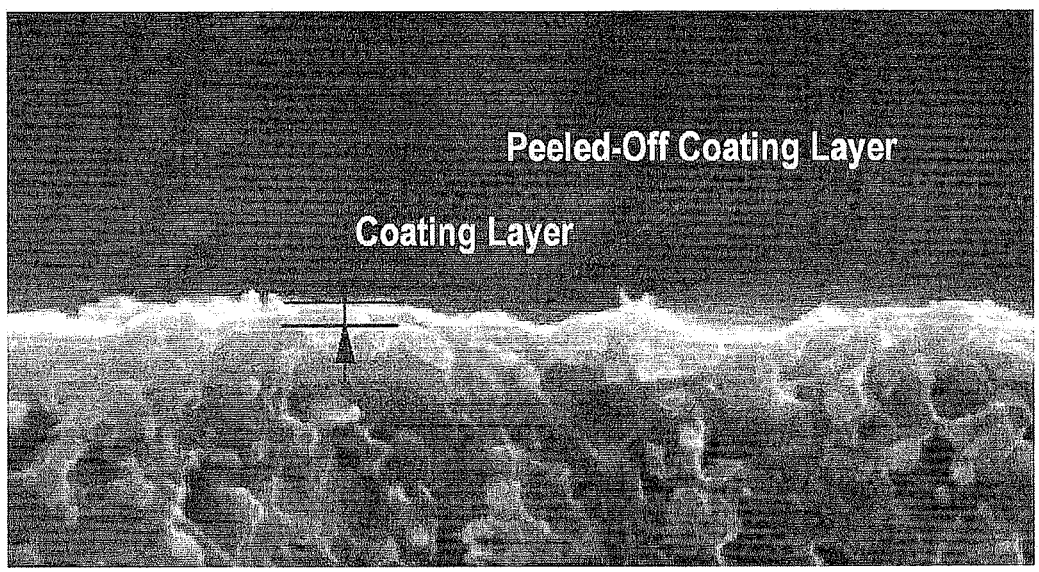

FIGS. 6 to 8 are photographs taken by an electron microscope at a magnification of 7000 for comparing the adhesion strengths of the coating layers to the substrates, which show cross-sections of said cutting insert and a conventional cutting insert, respectively. FIG. 6 shows a cross-section of a cutting insert constructed in accordance with the second embodiment of the present invention, wherein a coating layer having a composition of TiAlCrN is PVD coated with a thickness of about 1.2 μm on an alumina-based substrate having a composition of ($Al_2O_3$+35% TiCN+0.5% MgO+ 1.0% $Y_2O_3$). FIG. 7 shows a cross-section of one of the conventional cutting inserts, wherein a coating layer having a composition of TiN is PVD coated with a thickness of about 0.2 μm on an alumina-based substrate having a composition of ($Al_2O_3$+26% TiCN+0.5% MgO). FIG. 8 shows a cross-section of another conventional cutting insert, wherein a coating layer having a composition of TiN is PVD coated with a thickness of 0.2 μm on an alumina-based substrate having a composition of ($Al_2O_3$+30% TiCN+0.3% MgO).

As can be seen by comparing FIGS. 6 to 8, the cutting insert of FIG. 6 has the coating layer closely adhered to the substrate without any gap, whereas the coating layers of the cutting tools of FIGS. 7 and 8 are peeled off from several places of the surfaces (as indicated by arrows).

Figure 9:
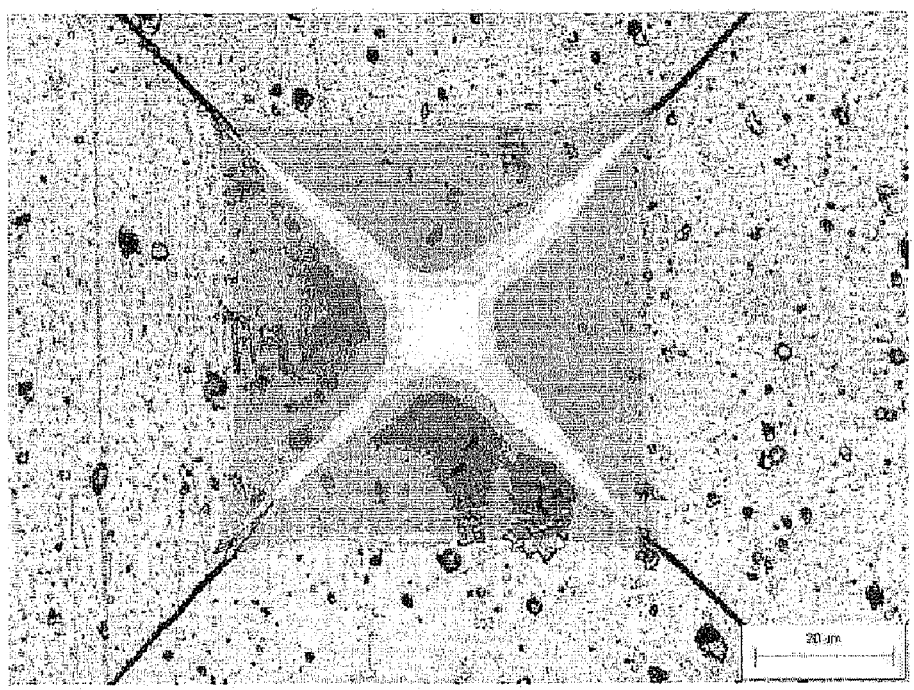
FIG. 9 is an optical microscopic photograph of the cutting tools of FIG. 6 after a Vickers hardness test is conducted to compare adhesion strength of the coating layer to the substrate.
Figure 10:
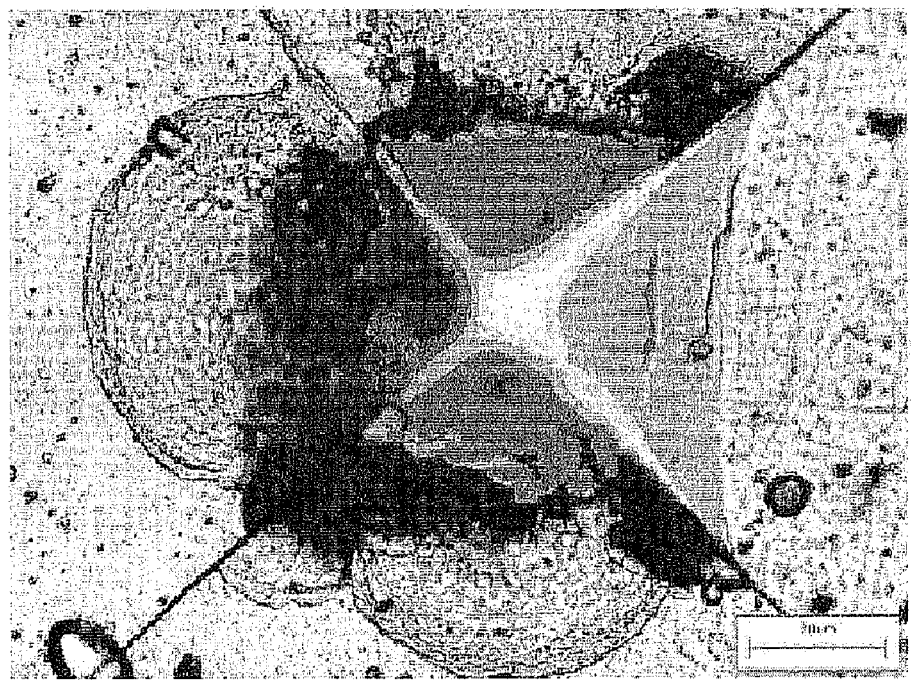
FIG. 10 is an optical microscopic photograph of the cutting tool of FIG. 7 after a Vickers hardness test is conducted to compare adhesion strength of the coating layer to the substrate.
Figure 11:
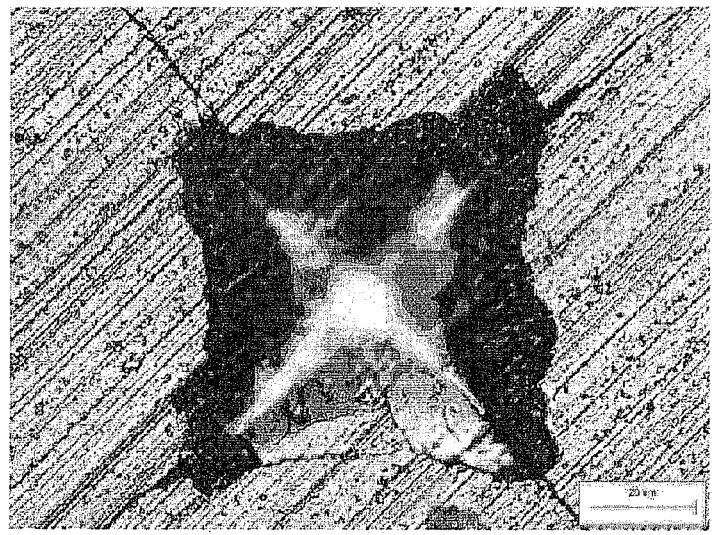
FIG. 11 is an optical microscopic photograph of the cutting tools of FIG. 8 after a Vickers hardness test is conducted to compare adhesion strength of the coating layer to the substrate.

FIG. 9 is a photograph for comparing the adhesion strength of the coating layer to the substrate, which was taken by an optical microscope at a magnification of 200. FIG. 9 shows a surface of the cutting insert according to the second embodiment of the present invention after it is subjected to a Vickers hardness test. FIGS. 10 and 11 are photographs taken through an optical microscope at a magnification of 200, which show the surfaces of the cutting inserts shown in FIGS. 7 and 8, respectively, after they are subjected to the Vickers hardness test.

By comparing FIGS. 9 to 11, it is confirmed that the coating layer of the cutting tool of FIG. 9 is not peeled off from the substrate and a pyramid-shaped indentation similar to the shape of the indenter is formed on its surface. The coating layers of the cutting tools of FIGS. 10 and 11 are heavily peeled off from the substrates of the cutting tools around the indenter.

The test examples of the cutting inserts, which are constructed in accordance with the present invention, are described below.

Test Example 1

A cutting performance test of the cutting insert, which is constructed in accordance with the present invention, was conducted as described below.

The tool life of each cutting insert was measured, wherein the tool life is the time spent for a wear amount of a flank face of the cutting tool to reach 0.25 mm.

In said cutting performance test, the following is used: a cutting insert A comprising a substrate having a composition of ($Al_2O_3$+8.0% $ZrO_2$+0.3% MgO) without any coating layer formed thereon; a cutting insert B comprising a first TiAlCrN coating layer and a second TiN coating layer on a substrate having the same composition as that of the cutting insert A; a cutting insert C comprising a TiN coating layer on a substrate having a composition of ($Al_2O_3$+3.0% $ZrO_2$+0.3% MgO); and a cutting insert D comprising a substrate having a composition of ($Al_2O_3$+10.0% $ZrO_2$+0.5% MgO) without any coating layer formed thereon. The cutting inserts are SNGN120412 turning inserts according to the ISO standards.

The cutting insert B is in accordance with the present invention, whereas the cutting inserts C and D are conventional.

Figure 12:
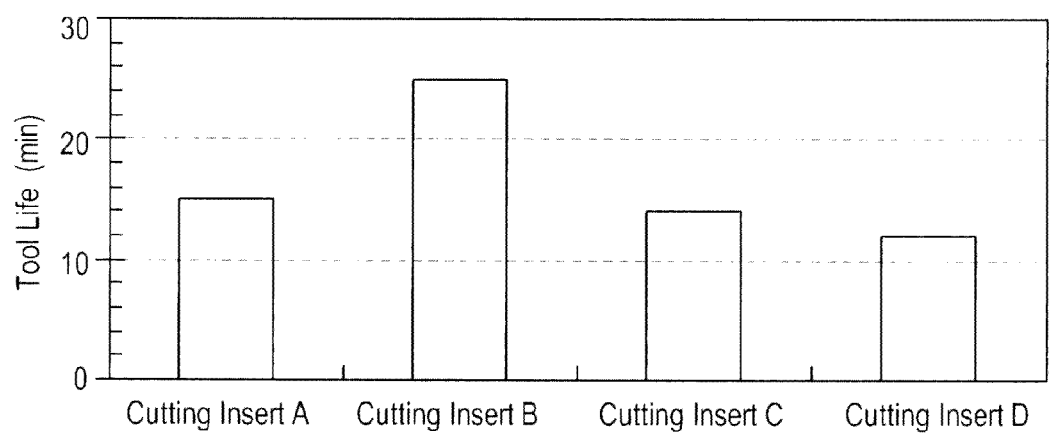
FIG. 12 is a graph comparing tool lives of the cutting tool in accordance with the first embodiment of the present invention and conventional cutting tools.
Figure 13:
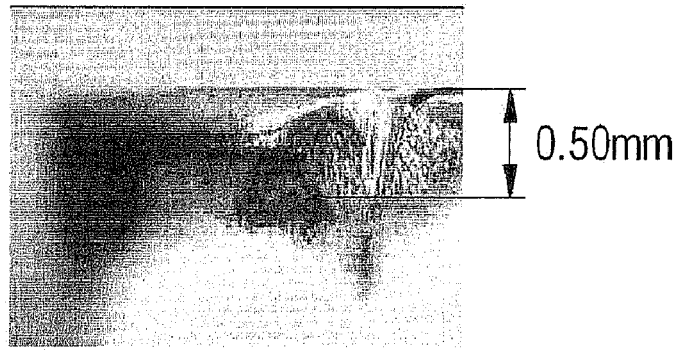
FIG. 13 is an optical microscopic photograph of the cutting tool in accordance with the first embodiment of the present invention, showing wear extent of a cutting edge after use.
Figure 14:
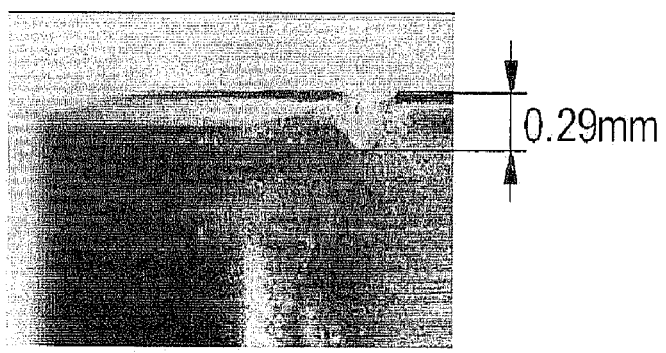
FIGS. 14 to 16 are optical microscopic photographs of conventional cutting tools, showing their respective wear extents of cutting edges after use.
Figure 15:
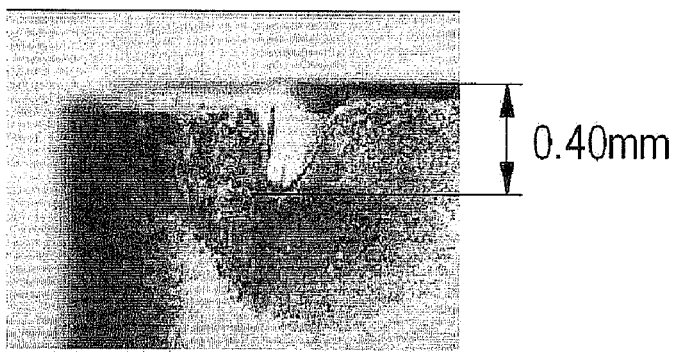
Figure 16:
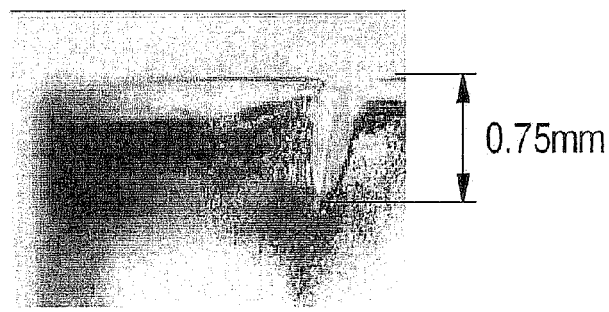

The cutting conditions were as follows: cutting speed (v)=600 rpm; feed rate (f)=0.3 mm/rev; and depth of cut (d)=2 mm. Furthermore, each cutting insert was tested to cut a gray cast iron rod having a diameter of 150 mm and a length of 700 mm. Test results are shown in [Table 1] below and FIG. 12.

TABLE 1

| Cutting Insert | Substrate | Coating Layer (Thickness μm) | | Cutting Result | |
| | | First Layer | Second Layer | Tool Life (min) | Remarks |
| --- | --- | --- | --- | --- | --- |
| A | $Al_2O_3$ + 8% $ZrO_2$ + 0.3% MgO | — | — | 15 | |
| B | $Al_2O_3$ + 8% $ZrO_2$ + 0.3% MgO | TiAlCrN (1.0) | TiN (0.2) | 26 | small amount of notch wear |
| C | $Al_2O_3$ + 3.0% $ZrO_2$ + 0.3% MgO | TiN (1.2) | — | 14 | |
| D | $Al_2O_3$ + 10.0% $ZrO_2$ + 0.5% MgO | — | — | 12 | |

Insert Type: SNGN120412
Work Material: Gray Cast Iron (HB190-200)
Cutting Condition: v = 600 rpm, f = 0.3 mm/rev, d = 2 mm, dry As can be seen from Table 1, the tool life of the coated cutting insert B according to the present invention was about twice longer than that of the uncoated cutting insert A having the same substrate. Further, it can be seen that the tool life of the cutting insert B according to the present invention was notably increased over those of conventional cutting inserts C and D. On the other hand, it can be seen that the TiN coating layer of the cutting insert C scarcely contributes to the enhancement of the tool life.

Furthermore, the present inventors proceeded with cutting the cutting inserts A to D for 15 minutes under the same conditions as above [TEST EXAMPLE 1] and measured a flank and a notch wear amounts of the cutting inserts after the cutting. The notch wear amount indicates a wear amount of the deepest worn section. The flank wear amount indicates an average wear amount of worn sections without the notch wear amount.

of the cutting inserts A to D [Table 2], respectively. It is observed that the wear amount of the cutting insert B is remarkably smaller that those of the other cutting inserts A, C and D. This is due to the excellent adhesion strength of the coating layer of the cutting insert B to the substrate, which prohibits the coating layer from easily peeling off from the substrate. The coating layer reduces friction coefficient between the cutting insert and workpiece (even in cast iron cuttings), thereby suppressing the wear of a cutting tool.

Test Example 2

The tool life of each cutting insert was measured, wherein the cutting inserts are: a cutting insert E comprising a substrate having a composition of ($Al_2O_3$+1.0% $Y_2O_3$+35.0% TiCN+0.5% MgO) without any coating layer formed thereon; a cutting insert F comprising a TiAlCrN coating layer formed on a substrate having the same composition as the cutting insert E; a cutting insert G comprising a TiN coating layer formed on a substrate having a composition of ($Al_2O_3$+26.0% TiCN+0.5% MgO); and a cutting insert H comprising a TiN coating layer formed on a substrate having a composition of ($Al_2O_3$+30.0% TiCN+0.3% MgO). The cutting inserts are CNGA120408 turning inserts according to the ISO standards. The cutting insert F is in accordance with the present invention, whereas the cutting inserts G and H are conventional.

TABLE 2

| Cutting Insert | Substrate | Coating Layer (Thickness μm) | | Cutting Result(mm) | |
| | | First Layer | Second Layer | Flank Wear (Vb) | Notch Wear (Vn) |
| --- | --- | --- | --- | --- | --- |
| A | $Al_2O_3$ + 8% $ZrO_2$ + 0.3% MgO | — | — | 0.25 | 0.50 |
| B | $Al_2O_3$ + 8% $ZrO_2$ + 0.3% MgO | TiAlCrN (1.0) | TiN (0.2) | 0.13 | 0.29 |
| C | $Al_2O_3$ + 3.0% $ZrO_2$ + 0.3% MgO | TiN (1.2) | — | 0.18 | 0.40 |
| D | $Al_2O_3$ + 10.0% $ZrO_2$ + 0.5% MgO | — | — | 0.27 | 0.75 |

Insert Type: SNGN120412
Work Material: Gray Cast Iron (HB190-200)
Cutting Condition: v = 600 rpm, f = 0.3 mm/rev, d = 2 mm, dry According to the cutting result, the cutting insert B according to the present invention has the smallest flank wear amount and notch wear amount.

Figure 17:
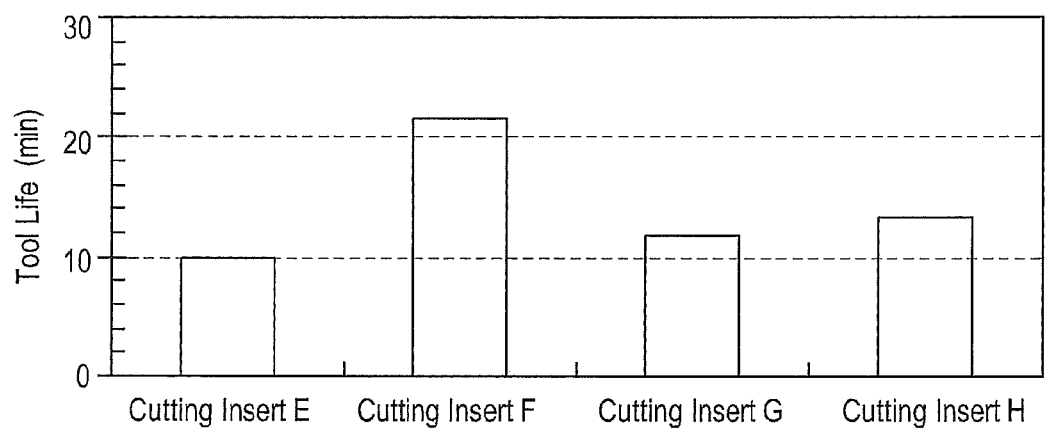
FIG. 17 is a graph comparing tool lives of the cutting tool in accordance with the second embodiment of the present invention and conventional cutting tools.
Figure 18:
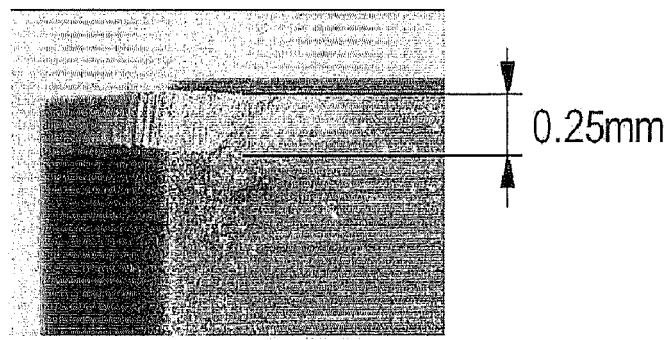
FIG. 18 is an optical microscopic photograph of the cutting tool in accordance with the second embodiment of the present invention, showing wear extent of a cutting edge after use.
Figure 19:
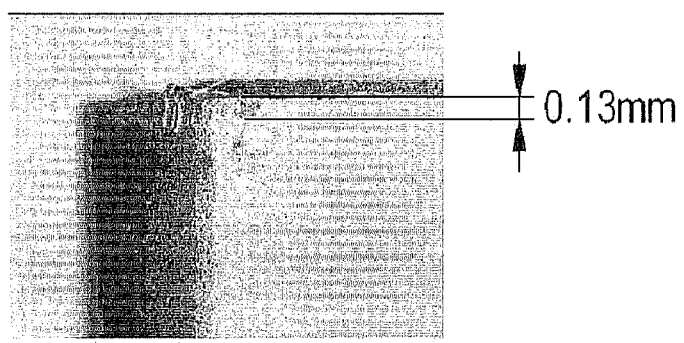
FIGS. 19 to 21 are optical microscopic photographs of conventional cutting tools, showing their respective wear extents of cutting edges after use.
Figure 20:
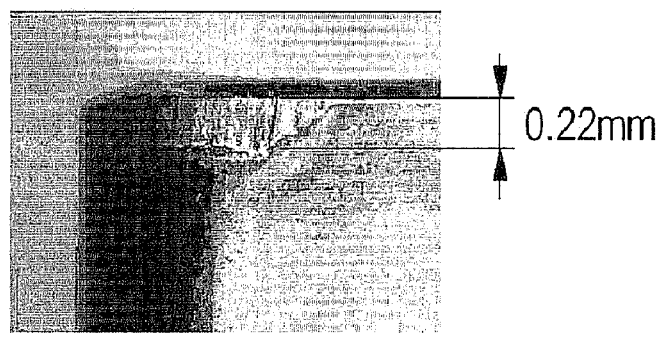
Figure 21:
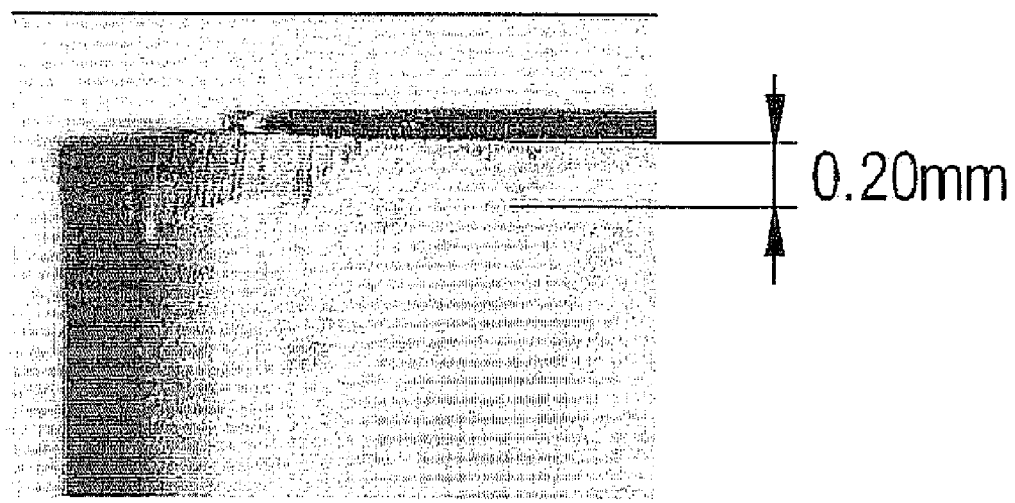

FIGS. 13 to 16 are photographs taken by an optical microscope at a magnification of 200, which show the worn features The cutting conditions were: cutting speed (v)=270 rpm; feed rate (f)=0.1 mm/rev; and depth of cut (d)=2 mm. Further, each cutting insert was tested to cut a hardened alloy steel rod having a diameter of 150 mm and a length of 700 mm. The results of such test are shown [Table 3] below and FIG. 17.

TABLE 3

|  |  |  | Cutting Result | |
| --- | --- | --- | --- | --- |
| Cutting Insert | Substrate | Coating Layer (Thickness μm) | Tool Life (min) | Remark |
| E | $Al_2O_3$ + 1.0% $Y_2O_3$ + 35.0% TiCN + 0.5% MgO | (—) | 20 | — |
| F | $Al_2O_3$ + 1.0% $Y_2O_3$ + 35.0% TiCN + 0.5% MgO | TiAlCrN (1.2) | 45 | show slow tool wear |
| G | $Al_2O_3$ + 26.0% TiCN + 0.5% MgO | TiN (0.2) | 25 | — |
| H | $Al_2O_3$ + 30.0% TiCN + 0.3% MgO | TiN (0.2) | 27 | — |

Insert Type: CNGA120408
Work Material: Hardened Alloy Steel (HRc 45-50)
Cutting Condition: v = 270 rpm, f = 0.1 mm/rev, d = 0.5 mm, wet As can be seen from above [Table 3], the tool life of the coated cutting insert F according to the present invention was about twice longer than that of the uncoated cutting insert E having the same substrate. Further, it can be seen that the tool life of the cutting insert F according to the present invention was significantly increased over those of conventional cutting inserts G and H.

Furthermore, cutting was performed with the cutting inserts E to H for 15 minutes under the same conditions as above [TEST EXAMPLE 2] and each feature of the cutting inserts was observed. The wear amount of each cutting insert is shown below.

TABLE 4

| Cutting Insert | Substrate | Coating Layer (Thickness μm) | Wear Amount (mm) |
| --- | --- | --- | --- |
| E | $Al_2O_3$ + 1.0% $Y_2O_3$ + 35.0% TiCN + 0.5% MgO | (—) | 0.25 |
| F | $Al_2O_3$ + 1.0% $Y_2O_3$ + 35.0% TiCN + 0.5% MgO | TiAlCrN (1.2) | 0.13 |
| G | $Al_2O_3$ + 26.0% TiCN + 0.5% MgO | TiN (0.2) | 0.22 |
| H | $Al_2O_3$ + 30.0% TiCN + 0.3% MgO | TiN (0.2) | 0.20 |

Insert Type: CNGA120408
Work Material: Hardened Alloy Steel (HRc 45-50)
Cutting Condition: v = 270 rpm, f = 0.1 mm/rev, d = 0.5 mm, wet As a cutting result, the cutting insert F showed the smallest wear amount.

FIGS. 18 to 21 are photographs taken by an optical microscope at a magnification of 200, which show the worn features of the cutting inserts E to H [Table 4], respectively. The cutting insert E, with an uncoated substrate is in black, while other cutting inserts with the coating layers made from TiAlCrN or TiN are in yellow. In case of cutting hardened alloy steel, uniform wear occurs in the cutting sections and notch wear is not observed, unlike in the case of cutting cast iron. This is due to the excellent adhesion strength of the coating layer of the cutting insert F to the substrate, which prohibits the coating layer from easily peeling off from the substrate. The coating layer reduces friction coefficient between the cutting insert and workpiece (even in cast iron cuttings), thereby suppressing the wear of a cutting tool.

While the present invention has been particularly shown and described with reference to exemplary embodiments thereof, it will be understood by those skilled in the art that various alternations or modifications can be made without departing from the scope of the present invention.

INDUSTRIAL APPLICABILITY

According to the alumina-based ceramic cutting tool of the present invention, the coating material is maintained with firm adhesion on the substrate and is not peeled off therefrom during high-speed cutting of a high hardness material such as cast iron or hardened steel. Thus, a cutting tool with a superior wear resistance and a greatly enhanced tool life is provided.

The invention claimed is:

1. A cutting tool comprising an alumina-based substrate and one or more Al—Ti—Cr based nitride coating layer formed on a surface of the substrate, wherein:

the alumina-based substrate comprises alumina, 5 to 80% by volume of metal carbonitride and 0.01 to 10% by volume of one or more metal oxides, wherein metal composing said metal carbonitride and said metal oxide is selected from a group consisting of elements of Groups III to VI (including La group and Ac group) in the periodic table of elements, Mg and Co.

2. The cutting tool of claim 1, wherein the alumina-based substrate comprises 0.1 to 10% by volume of one or more of said metal oxides.

3. The cutting tool of claim 1, wherein the one or more Al—Ti—Cr based nitride coating layer is $Al_W Ti_X Cr_Y Si_Z C_V N_{1-V}$ (W+X+Y+Z=1, 0<W<1, 0<X<1, 0<Y<1, 0<Z<1, V=0-1).

4. The cutting tool of claim 1, wherein the one or more Al—Ti—Cr based nitride coating layer has a thickness of 0.3 to 5.0 μm.

5. The cutting tool of claim 1, wherein the one or more Al—Ti—Cr based nitride coating layer has a thickness of 0.5 to 2.0 μm.

6. The cutting tool of claim 1 comprising one or more PVD-deposited Al—Ti—Cr based nitride coating layer.

* * * * *